United States Patent
Stevens et al.

(10) Patent No.: US 8,782,745 B2
(45) Date of Patent: Jul. 15, 2014

(54) DETECTION OF UNAUTHORIZED WIRELESS ACCESS POINTS

(75) Inventors: Gilman R. Stevens, Fairview, TX (US); Charles I. Cook, Louisville, CO (US)

(73) Assignee: Qwest Communications International Inc., Denver, CO (US)

(*) Notice: Subject to any disclaimer, the term of this patent is extended or adjusted under 35 U.S.C. 154(b) by 758 days.

(21) Appl. No.: 11/467,495

(22) Filed: Aug. 25, 2006

(65) Prior Publication Data

US 2008/0066157 A1 Mar. 13, 2008

(51) Int. Cl.
H04L 9/32 (2006.01)

(52) U.S. Cl.
USPC .................................... 726/4; 726/5

(58) Field of Classification Search
USPC ............ 726/2, 3, 4, 22, 26, 34; 709/212, 213, 709/220, 230, 250; 380/1, 255, 256, 257, 380/277; 711/145, 150
See application file for complete search history.

(56) References Cited

U.S. PATENT DOCUMENTS

| | | |
|---|---|---|
| 6,112,078 A | 8/2000 | Sormunen et al. |
| 6,870,822 B2 | 3/2005 | Balogh |
| 6,970,705 B2 | 11/2005 | Yoshimoto et al. |
| 7,050,789 B2 | 5/2006 | Kallio et al. |
| 7,068,999 B2 | 6/2006 | Ballai |
| 7,075,912 B2 | 7/2006 | Suda et al. |
| 7,103,359 B1 | 9/2006 | Heinonen et al. |
| 7,133,526 B2 | 11/2006 | Whelan et al. |
| 7,158,777 B2 | 1/2007 | Lee et al. |
| 7,203,481 B2 | 4/2007 | Nakao |
| 7,231,203 B2 | 6/2007 | Marcelli |
| 7,283,820 B2 | 10/2007 | Kamijo et al. |
| 7,342,906 B1 | 3/2008 | Calhoun |
| 7,346,338 B1 | 3/2008 | Calhoun et al. |
| 7,395,050 B2 | 7/2008 | Tuomi et al. |
| 7,453,840 B1 | 11/2008 | Dietrich et al. |
| 8,457,594 B2 | 6/2013 | Stevens et al. |
| 2002/0157090 A1 | 10/2002 | Anton, Jr. |
| 2003/0048174 A1 | 3/2003 | Stevens et al. |
| 2003/0186679 A1 | 10/2003 | Challener et al. |
| 2004/0003285 A1* | 1/2004 | Whelan et al. ................ 713/201 |
| 2004/0249961 A1 | 12/2004 | Katsube et al. |
| 2005/0030929 A1* | 2/2005 | Swier et al. .................. 370/338 |
| 2005/0114649 A1* | 5/2005 | Challener et al. ............ 713/155 |
| 2005/0202800 A1* | 9/2005 | Wang ......................... 455/404.1 |
| 2006/0064588 A1* | 3/2006 | Tidwell et al. ............... 713/169 |
| 2006/0209700 A1* | 9/2006 | Sundar et al. ................ 370/248 |
| 2007/0077916 A1 | 4/2007 | Saito |
| 2008/0052512 A1 | 2/2008 | Stevens et al. |
| 2008/0059804 A1 | 3/2008 | Shah et al. |
| 2008/0295159 A1 | 11/2008 | Sentinelli |

OTHER PUBLICATIONS

Wolfe (2005) American Banker 12(1):226-227, "Wachovia mulling ID authentication tools," 2 pages.

(Continued)

Primary Examiner — Brandon Hoffman
Assistant Examiner — Nega Woldemariam
(74) Attorney, Agent, or Firm — Swanson & Bratschun, L.L.C.

(57) ABSTRACT

A public wireless network has authorized wireless access points through which users connect to the network. A system for detecting the unauthorized access points comprises a monitoring client simulating a user and detecting available access points. The system further comprises an authentication server that maintains a configuration file with an identifier associated with each authorized access point. The system is adapted to compare the identity of any available access point(s) to those maintained by the authentication server to detect unauthorized access points.

19 Claims, 2 Drawing Sheets

(56) References Cited

OTHER PUBLICATIONS

U.S. Appl. No. 11/467,481, Office Action dated Apr. 14, 2009, 15 pages.
U.S. Appl. No. 11/467,481, Final Rejection dated Oct. 26, 2009, 19 pages.
U.S. Appl. No. 11/467,481, Advisory Action dated Jan. 19, 010, 3 pages.
U.S. Appl. No. 11/467,481, Advisory Action dated Jun. 9, 2010, 23 pages.
U.S. Appl. No. 11/467,481, Final Rejection dated Nov. 22, 2010, 24 pages.
U.S. Appl. No. 11/467,481; Issue Notification dated May 15, 2013; 1 page.
U.S. Appl. No. 11/467,481; Notice of Allowance dated Jan. 3, 2013; 36 pages.
U.S. Appl. No. 11/467,481; Final Office Action dated Nov. 22, 2011; 20 pages.
U.S. Appl. No. 11/467,481, Office Action dated Jun. 22, 2011, 18 pages.

* cited by examiner

DETECTION OF UNAUTHORIZED WIRELESS ACCESS POINTS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

Public wireless networks have become a popular way for consumers to access the internet. Networks that operate in accordance with IEEE (Institute of Electrical and Electronics Engineers) standards 802.11a, 802.11b, 802.11g, and 802.11n are often referred to as "WiFi", and are now frequently found in many locations accessible to the public, such as airports, coffee shops, and hotels. In some locations, public wireless networks may be used free of charge, and in other locations the user may be charged a fee by the operator in order to access the network.

Public networks are expected to expand even further with recent efforts to build and operate municipal or metropolitan networks that operate under similar IEEE standards (e.g., WiFi, WiMAX). In such networks (sometimes referred to as "Muni-WiFi"), access points are located throughout a municipal, metropolitan or other large geographical area, so that consumers will have wireless access to the internet anywhere within that area.

Unfortunately, identity thieves and hackers have recognized the opportunity to use WiFi networks to steal personal information from users. For example, a thief will set up an unauthorized access point (sometimes referred to as an "evil twin") near the network, sometimes with a name or ID that appears to be related to the authorized network. The user connects to the unauthorized access point, and may see a screen that has been designed by the thief to look like the authorized access point. For example, the screen may have a logo and other graphics that are similar to those found when accessing the authorized access point, such as the name of the coffee shop or hotel that operates the network or hotspot. The thief may request personal information from the user, and also capture information sent by the user when using the unauthorized access point during an internet session.

BRIEF SUMMARY OF THE INVENTION

There is provided, in accordance with embodiments of the present invention, a network/system and method for identifying unauthorized access points (e.g., so-called "evil twins") operating near a wireless network.

In one embodiment, a system for detecting unauthorized access points is associated with a public wireless network for connecting users to the internet The system includes a monitoring device connected to the network that simulates a user and requests connection to the network through an available access point, and an authentication server that maintains a configuration file with an identifier associated with each authorized access point for the network. The monitoring device requests an identifier from the available access point, and the authentication server compares the requested identifier with each identifier in the configuration file, in order to determine whether the available access point is an authorized access point.

A more complete understanding of the present invention may be derived by referring to the detailed description of the invention and to the claims, when considered in connection with the attached Figures.

DETAILED DESCRIPTION OF THE INVENTION

Figure 1:
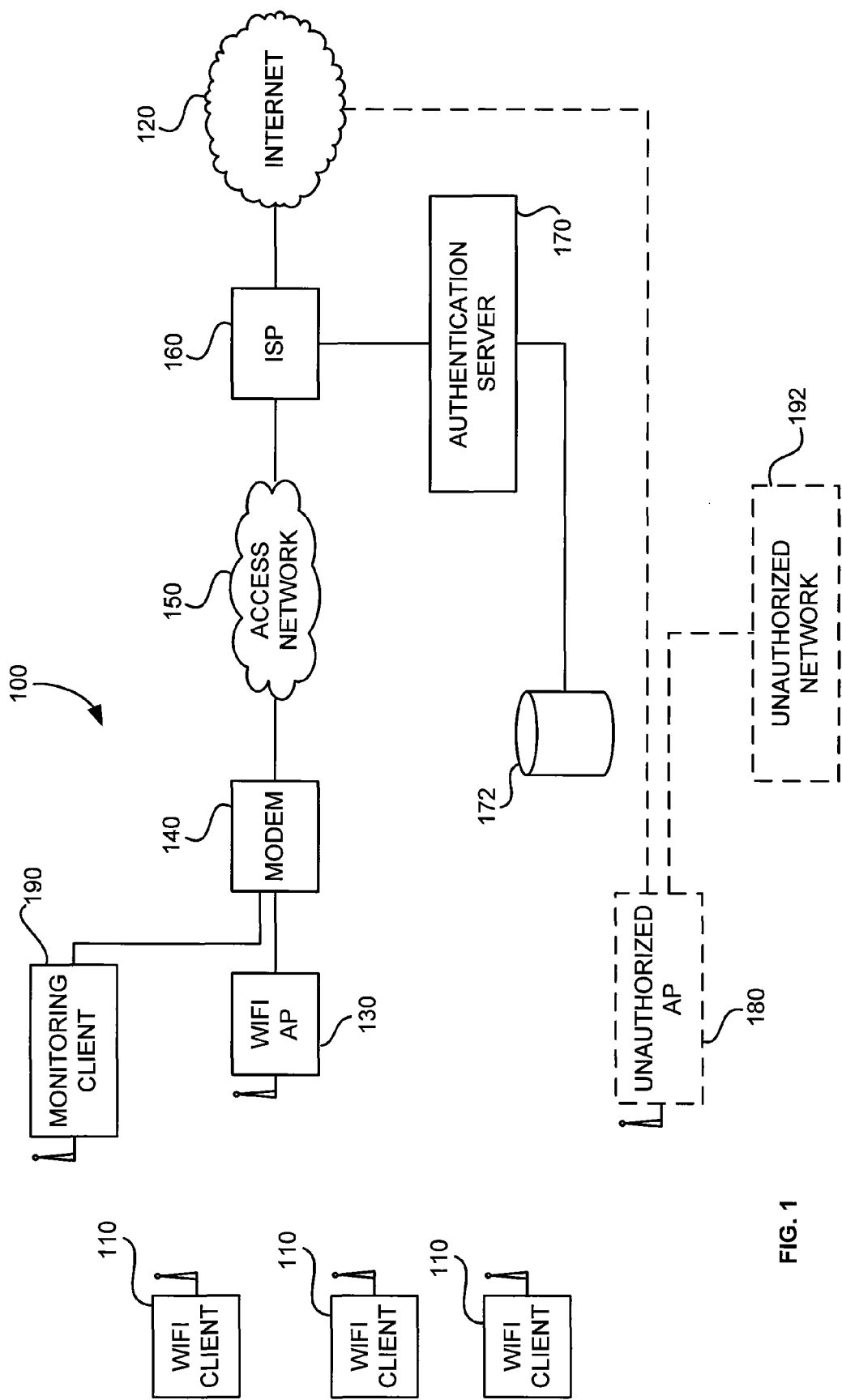
FIG. 1 illustrates a network operating in accordance with one embodiment of the invention.

There are various embodiments and configurations for implementing the present invention. One such implementation is shown in FIG. 1, where according to an embodiment of the invention a network 100 connects users or WiFi clients 110 to the internet 120. As an example, a user 110 may be a person with a laptop computer or similar device desiring to access the internet through the network 100. The network 100 includes an access point (WiFi AP) 130 establishing a "hotspot" through which each of the users 110 communicate in accordance with well known wireless standards and protocols (e.g., IEEE 802.11a/b/g/n). While only a single AP 130 is seen in FIG. 1, it should be appreciated that depending on the size of the area served or the number of users 110 that are to be connected, there could be multiple APs 130 at the hotspot providing wireless connections to users at the network 100.

AP 130 is connected through a modem 140 (such as a DSL modem, cable modem, etc.) to an access network 150, which may be a PSTN (public switched telephone network) employing DSL technology, a high speed cable network, or other broadband or high speed data network. The user is provided connectivity to the internet through an Internet Service Provider (ISP) 160. The ISP maintains servers for providing various applications (email, security, etc.), including an authentication server 170 (and its associated database or memory store 172), which authenticates approved users and provides features (to be described later) for identifying and handling unauthorized access points, such as an unauthorized AP 180.

As described earlier, a person setting up a unauthorized AP may do so for the purpose of "spoofing" or imitating an authorized AP (such as the WiFi AP 130) in order to steal data or obtain personal information from one of the users 110. Such a scheme may include setting up an access point in a nearby building or from a mobile location (e.g., automobile) within range of the area served by the AP 130. The unauthorized AP 180 may be set up to have the "look and feel" of an authorized access point. Among other things, it may be set up to have a name, MAC (media access control) address or SSID (service set identifier) confusingly similar to the name, address or identifier for the network 100. It may be programmed with a portal or "splash" page that resembles the portal or page set up by the operator of the network 100.

As an example, if the network 100 is located at a coffee shop, a user that has a WiFi enabled laptop computer and that is visiting the coffee shop may see several APs visually displayed on the computer screen when the computer is turned on, and mistakenly pick one that has a name similar to the name of the coffee shop but that is in fact unauthorized AP 180. The user thus unwittingly selects the unauthorized AP 180 and then sees an opening or "splash" page that bears the name or logo of the coffee shop (or something similar to the name or logo). Thereafter, any data being entered by the user is monitored by the unauthorized AP 180 (and the person operating that AP). The unauthorized AP 180 may connect the user to the internet, so that the user unsuspectingly goes to a trusted site (e.g., a banking site, or another site where personal data is entered), and while at the site has all of his or her data monitored by the unauthorized AP. The unauthorized AP 180 may also connect to a private "unauthorized" network or system 192, which may execute applications (and display screens) soliciting private data from the user.

Referring still to FIG. 1, the network 100 includes a monitoring client 190. The monitoring client 190 may be a software program or element running at the AP 130 or may be a separate device within network 100, and serves as a simulated local client or user that attempts to connect to any AP operating within the range served by authorized AP 130. Monitoring client 190 operates in conjunction with authentication server 170 to check the authenticity of any access point that it detects. As will be described shortly, when an access point is detected, its identity, such as its MAC (media access control) address or other ID, is checked against the address or identity of the AP 130 (and any other authorized AP at the hotspot).

As should be appreciated, many areas served by wireless access points may be served by more than one operator. For example, if two different commercial entities have set up hotspots nearby each other, users will often see authorized access points for both (as well as any unauthorized AP that may be operating in the same area). In one embodiment of the invention, the operator of the network 100 will be alerted by the authentication server 170 as to any access points not authorized to be in the network, and will dispatch a technician to locate the access point. The technician may determine manually (on-site) at the hotspot the strength or directionality of signals from the unauthorized AP and use triangulation or similar methods to pinpoint the location of the access point. Alternatively, there may be more than one monitoring client 190, with each such client having signal strength or directionality detection circuits, which provide data to the authentication server 170 so that the location of unauthorized access point 180 may be calculated and determined at the server 170.

If the unauthorized AP 180 is an access point associated with a nearby, legitimate (but unaffiliated) hotspot (rather than an "evil twin"), that information can be stored in the authentication server 170 in order to avoid multiple alerts for such a legitimate adjacent hotspot. In addition, authentication server 170 can provide a message to any person connecting to authorized access point 130, alerting the user as to the adjacent hotspot and advising the user to make sure they have reached the intended hotspot or network (such as the network 100 rather than an adjacent, legitimate hotspot or an unauthorized AP 180).

Figures 2, 3:
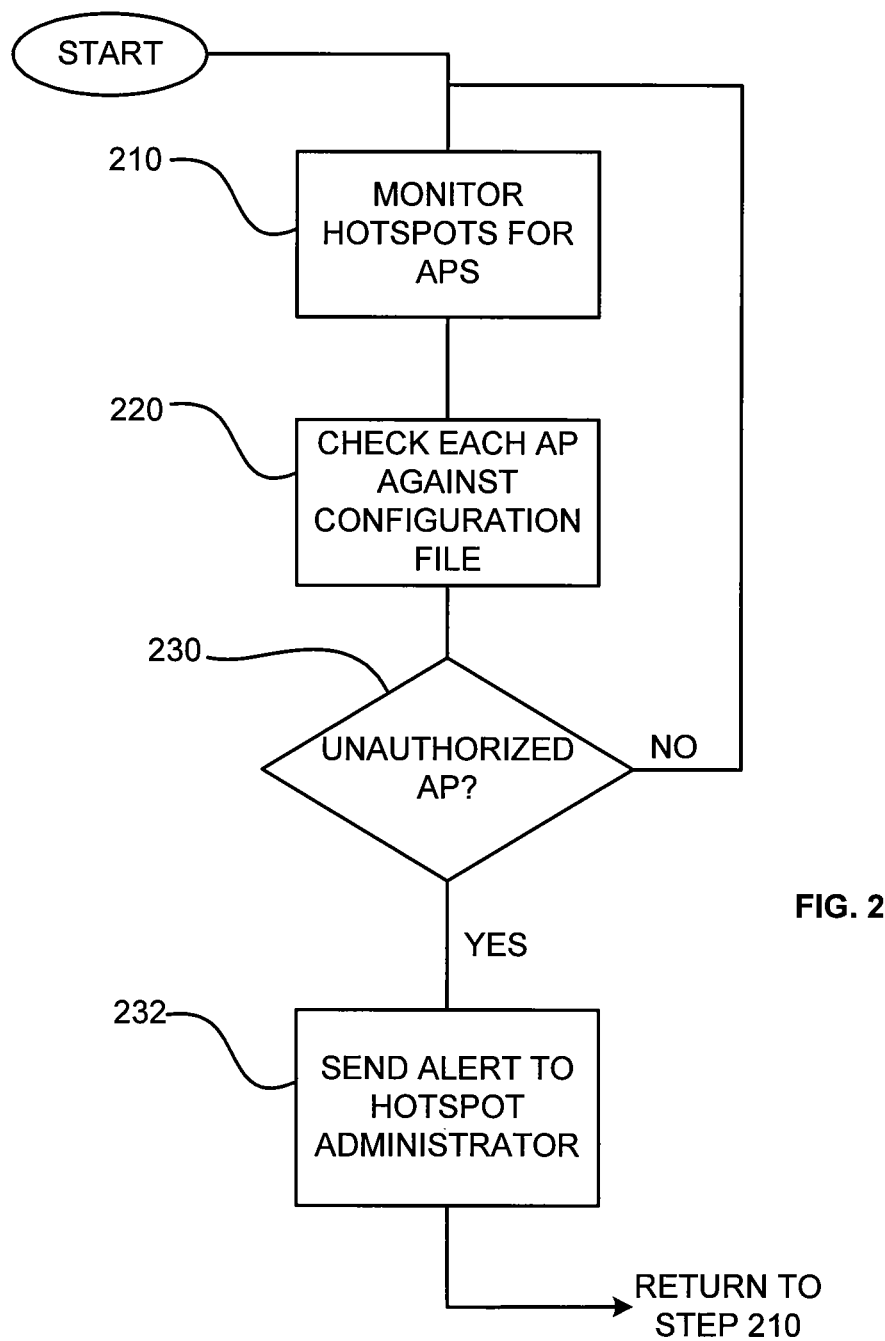
FIG. 2 is a flow diagram illustrating the operation of the network of FIG. 1, implementing a method for detecting unauthorized access points.
FIG. 3 is a configuration file maintained in the authentication server seen in FIG. 1.

Turning now to FIG. 2, programmed steps are illustrated that implement one embodiment for monitoring the area served by network 100. The various steps may be carried out by software/programming resident at one or both of the monitoring client 190 and the authentication server 170 (FIG. 1).

At step 210, the monitoring client 190 periodically attempts to connect to the network by connecting to any available access point. For example, the monitoring client 190 can be prompted to make attempts in accordance with an internal schedule maintained at the monitoring client, or in response to periodic commands from the authentication server 170. The MAC address (or other identifier) associated with the access point is read from the data frame or message from the access point, and such address (or other identifier) is compared (step 220) to addresses (or other identifier) stored within a configuration file maintained within database 172 (FIG. 1). An example of the configuration file is illustrated in FIG. 3, where three APs (AP1-AP3) are operated as authorized access points, each having a corresponding address ($AP_{EXT1}$-$AP_{EXT3}$).

If the access point available to the monitoring client is not recognized (unauthorized) and not contained in the configuration file (step 230), then an alert is sent to the hotspot administrator or technician (step 232) for further investigation. If the available access point is one stored in the configuration file, then the process continues checking for any additional available access points.

In some cases, a person (hacker) operating an unauthorized access point may attempt to use an identifier (e.g., MAC address or SSID) associated with an authorized access point. For example, the hacker may monitor the network 100 before setting up his/her "evil twin," and read the MAC address or SSID associated with other access points, and then use that name or address for the unauthorized access point. The authentication server 170 may be programmed to detect when more than one available access point is using the same MAC address or ID, and in such case send users a message alerting them as to the possible presence of an unauthorized access point.

While a detailed description of presently preferred embodiments of the invention has been given above, various alternatives, modifications, and equivalents will be apparent to those skilled in the art without varying from the spirit of the invention. As an example, the network 100 could be a metropolitan network (e.g., operated on behalf of a municipality) covering a relatively large geographical area, having numerous authorized access points 130, and operating in accordance with so-called WiMax standards (e.g., IEEE Standard 802.16). Therefore, the above description should not be taken as limiting the scope of the invention, which is defined by the appended claims.

What is claimed is:

1. In a public wireless network where users connect to the network through a wireless access point, a system for detecting unauthorized access points, comprising:
    a monitoring device connected to the network that simulates a user and requests connection to the network through an available access point; and
    an authentication server that authenticates users and maintains a configuration file with an identifier associated with each authorized access point for the network;
    wherein the monitoring device requests an identifier from the available access point, the requested identifier identifying the available access point, and wherein the authentication server compares the requested identifier with each identifier in the configuration file, in order to determine whether the available access point is an authorized access point.

2. The system of claim 1, wherein a physical location is determined for any available access point that does not have an associated identifier in the configuration file.

3. The system of claim 2, wherein triangulation methods are used to determine the location of the unauthorized access point.

4. The system of claim 3, wherein there is further maintained in the configuration file an identifier for any access point that is determined to be an access point of a legitimate, nearby network.

5. The system of claim 1, wherein the monitoring device is a programmed element of an authorized access point.

6. The system of claim 1, wherein the monitoring device is a device separate from any authorized access point.

7. The system of claim 1, wherein the network has multiple authorized access points.

8. The system of claim 1, wherein the network is a WiFi network.

9. The system of claim 1, wherein the network connects a user to the internet.

10. The system of claim 1, wherein an alert is provided by the authentication server when the available access point is not an authorized access point.

11. A method for detecting unauthorized access points in a public wireless network serving wireless users within a predetermined geographical area, comprising:
   storing an identifier associated with one or more authorized access points for the network;
   providing a monitoring client that simulates a user for detecting available wireless access points within the area;
   requesting, with the monitoring client, an identifier from an available access point, wherein the identifier identifies the available access point;
   determining an identity of the available access point, based at least in part on the identifier;
   comparing, with an authentication server, the identity of the available access point with the stored identifier associated with the authorized access point; and
   authenticating users, with the authentication server.

12. The method of claim 11, further comprising:
   determining the physical location of any available access points that do not have a stored associated identifier.

13. The method of claim 11, wherein the monitoring client is a device separate from any authorized access point.

14. The method of claim 11, wherein the network has multiple authorized access points.

15. The method of claim 11, wherein the network is a WiFi network.

16. The method of claim 15, wherein the network connects a user to the internet.

17. The method of claim 11, further comprising:
   providing an alert from the authentication server when an available access point is not an authorized access point.

18. The system of claim 1 wherein,
   the identifier comprises one of a MAC address and a SSID; and
   the authentication server is adapted to detect a rogue access point when more than one available access point is using the same MAC address or SSID.

19. The method of claim 11 wherein,
   the stored identifier and the identifier comprise one of a MAC address and a SSID; and further comprising,
   detecting a rogue when more than one available access point is using the same MAC address or SSID.

* * * * *